UNITED STATES PATENT OFFICE.

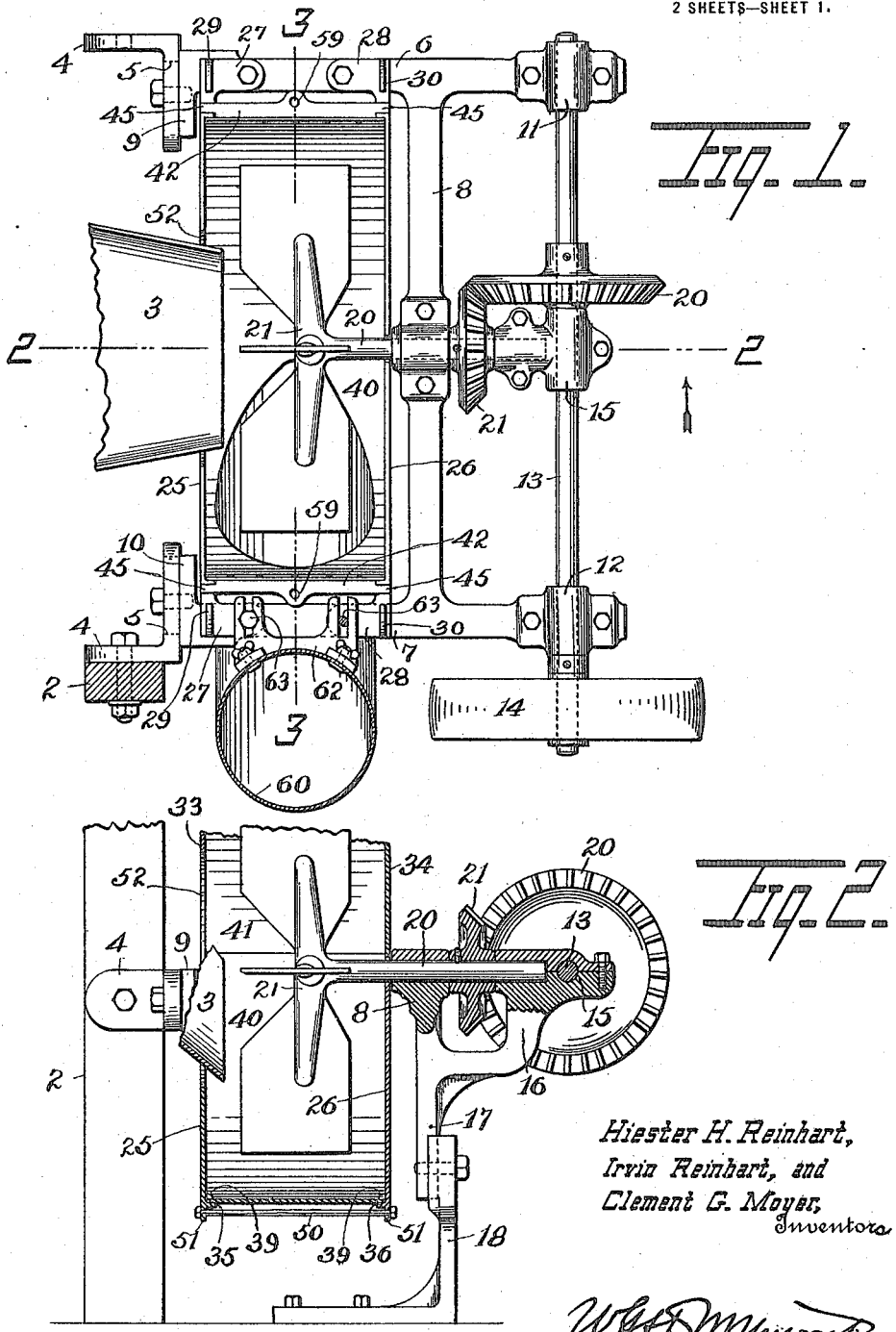

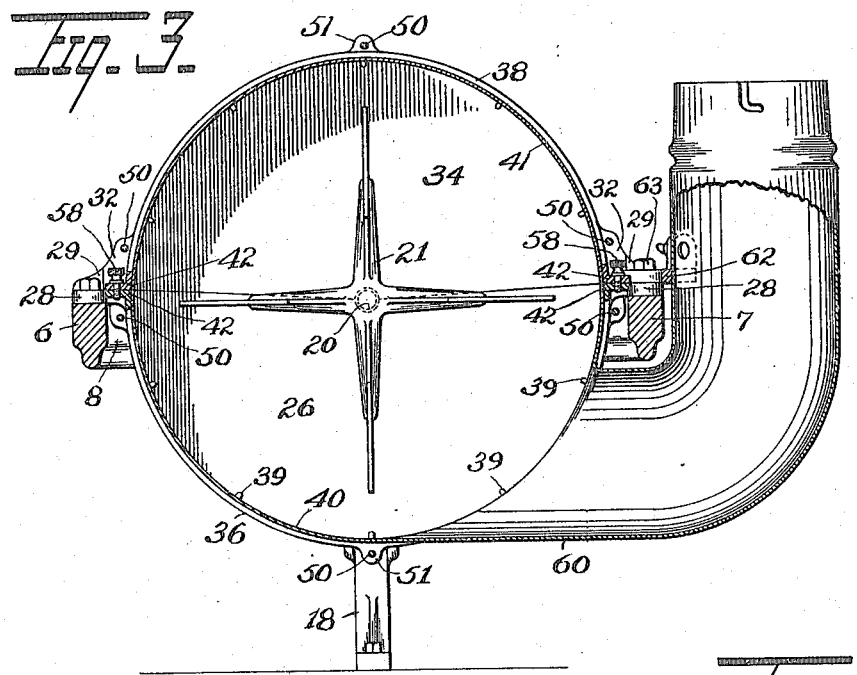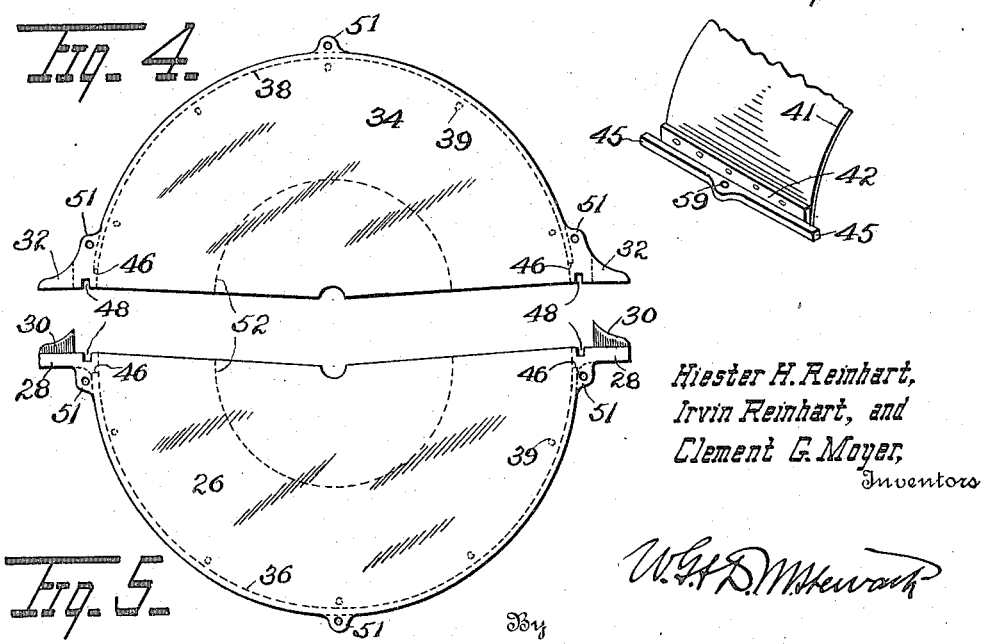

HIESTER H. REINHART AND IRVIN REINHART, OF VIRGINVILLE, AND CLEMENT G. MOYER, OF MOLLTOWN, PENNSYLVANIA.

CONVEYER ATTACHMENT FOR FEED-CUTTING MACHINES.

1,193,063.   Specification of Letters Patent.   Patented Aug. 1, 1916.

Application filed May 18, 1915. Serial No. 28,816.

*To all whom it may concern:*

Be it known that we, HIESTER H. REINHART and IRVIN REINHART, residing at Virginville, and CLEMENT G. MOYER, residing at Molltown, in the county of Berks and State of Pennsylvania, citizens of the United States, have invented certain new and useful Improvements in Conveyer Attachments for Feed-Cutting Machines, of which the following is a specification.

Our invention relates to conveyer attachments of the blower type for feed cutting machines or the like and our object is to provide a conveyer of simple and substantial construction that may be readily set up for either right or left hand delivery and attached to cutters of different makes.

The invention is fully described in connection with the accompanying drawings and the novel features are particularly pointed out in the subjoined claims.

Figure 1 is a plan view of our conveyer, the cover-section of the drum being removed. Fig. 2 is a partial sectional elevation on the line 2—2 of Fig. 1. Fig. 3 is a sectional elevation on the line 3—3 of Fig. 1. Figs. 4, 5 and 6 are detail views of the upper and lower drum disks and the drum band respectively.

Our conveyer is intended to be secured to any well known cutting machine, and in the drawings 2 represents a supporting leg and 3 the feed chute of such a machine. To the legs 2 of the cutter we adjustably secure, by means of angle-brackets 4, which have slotted bolt holes 5 to provide for differences in spread of the legs in different cutting machines, a supporting frame which carries our conveyer and driving means therefor. This supporting frame, as shown, is formed of parallel side-members 6 and 7, connected by a cross-member 8. At one end, the side-members 6 and 7 are formed with bolting flanges 9 and 10 for connection with the brackets 4, and their opposite ends are projected beyond the cross-member 8 and provided with bearings 11 and 12 for the drive shaft 13 with its drive pulley 14. This shaft 13 also has an intermediate bearing 15 in the bracket-arm 16 of the cross-member 8, and an extension 17 of said bracket is adjustably secured to a standard 18 so as to support the frame in a horizontal position. Journaled in the cross-member 8 and bracket 16 is a fan or blower shaft 20, at right angles to drive shaft 13 and its projecting end carries a fan 21. Intermeshing bevel gears 20 and 21 operatively connect the shafts 13 and 18. The shaft 13 with its pulley 14 and gear 20 may be reversed in its bearings 11, 12 and 15 so as to readily provide for driving from either side of the frame.

The fan 21 is projected into the space between the flanges 9 and 10 of the side-members 6 and 7, and the cross-member 8, and we inclose this fan with a drum having a conveyer outlet for delivery of the cut material fed to the drum by the chute 3. This drum we preferably make up as now described for ease in assembly and to provide for changing the conveyer outlet for delivery on either side of the frame. As shown this drum is made up of a top and bottom section each having spaced half-disks connected by a band-portion forming the circumference of the drum. The half-disks 25 and 26 of the bottom section have bolting-lugs 27, 28 to support and secure them to the frame members 6 and 7 and projecting tongues 29 and 30 to engage with correspondingly grooved ear-extensions 31, 32 of the top section half-disks 33 and 34 to properly locate and maintain the sections when superimposed. Both the lower and upper half-disks 25, 26 and 33, 34 are peripherally flanged inwardly as shown at 35, 36, 37 and 38 and retaining lugs 39 on the inner faces of the half-disks are arranged at spaced intervals within the flange. The circumferential portion of each section of the drum is made of a band of sheet metal 40 or 41 of proper width bent to the curvature of the half-disks and inserted between the flanges 35—36 or 37—38 and the retaining lugs 39. To the ends of these bands 40 and 41 are secured angle-bar retaining strips 42 the full width of the bands and formed with locking extensions 45. The flanges 35, 36, 37 and 38 are cut away on the meeting faces of the half-disks, as shown at 46, Figs. 4 and 5, to receive the strips 42, and the meeting face of each half-disk is also provided with a notch 48 to receive the extensions 45. When placed in position these retaining strips form a continuation of the disk-flanges and the sheet metal bands secured thereto are firmly held between the flanges and the retaining lugs 39. Bolts 50, secured in ears 51 formed on the disks, securely retain the disks in fixed spaced position with the band portions 40 and 41 locked in position therein. The rear disks 26—34 are cut out to inclose the fan shaft 20, while the front disks 25—33 are provided with an opening 52 through which the chute 3 extends. The top section of the drum which, it will be seen, may be removed for inspection of the interior without disturbing any of the adjustments, is preferably connected as shown by knurled screws 58 engaged in opening 59 formed in the strips 42. The bottom-section band portion 40, as shown, is formed with a conveyer-pipe extension 60 which is preferably bent so as to rise outside a side-frame member, and its upper end is formed with any suitable locking means for connection of a tube extension to carry the material delivered from the conveyer drum to the desired discharging point. This bent conveyer pipe is conveniently supported by means of the bolts 63 of the lugs 27—28. This construction of the drum readily provides for easy renewal and assembly of the parts and permits of quickly reversing the band section 40 with its extension 60 for delivery at either side of the frame, the bracket 62 being adapted for connection to either side of the frame.

Our conveyer is of simple and strong construction and of adequate power to deliver the material fed to it at a point considerably distant from the cutting machine, and it carries with it all the dirt and dust stirred up by the cutter. The driving mechanism and conveyer pipe extension being reversible for either right or left hand service, and the supporting frame being adjustably secured to the cutting machine frame make it useful in connection with any make of cutter. And it is equally applicable to other machines than fodder cutting machines.

What we claim is:

1. In a conveyer attachment for feed cutting machines, a supporting frame, a fan- and-driving mechanism therefor journaled in the frame, and a drum inclosing said fan, said drum being made up of top and bottom sections each comprising spaced front and rear half-disks having interlocking tongues, notches in the meeting-faces of each half-disk, a band-portion peripherally held between said half-disks, locking strips secured to the ends of each band-portion and engaged in said notches, and a conveyer pipe extension of the bottom band-portion.

2. In a conveyer attachment for feed cutting machines, a supporting frame, a fan- and-driving mechanism therefor journaled in the frame, and a drum inclosing said fan, said drum being made up of top and bottom sections each comprising spaced front and rear half-disks having interlocking tongues, notches in the meeting-faces of each half-disk, a band-portion peripherally held between said half-disks, locking strips secured to the ends of each band-portion and engaged in said notches, locking means engaging the superimposed locking strips, and a conveyer-pipe extension of the bottom-band portion.

3. In a conveyer attachment for feed cutting machines, a supporting frame, a fan- and-driving mechanism therefor journaled in the frame, and a drum inclosing said fan, said drum being made up of spaced front and rear disks and a circumferential band portion peripherally held between said disks, and a conveyer-pipe extension of said band-portion, bolting lugs on said disks to secure them to the frame, and a conveyer-pipe support adjustably secured to the frame.

In testimony whereof we affix our signatures.

HIESTER H. REINHART.
IRVIN REINHART.
CLEMENT G. MOYER.

Copies of this patent may be obtained for five cents each, by addressing the "Commissioner of Patents, Washington, D. C."